Jan. 2, 1962   C. E. MAKI   3,015,229
APPARATUS FOR USE IN A VIBRATION TESTING SYSTEM
Filed March 10, 1958   2 Sheets-Sheet 1

INVENTOR
CHARLES E. MAKI
BY
Byerly, Townsend, Watson & Churchill
ATTORNEYS.

Jan. 2, 1962 C. E. MAKI 3,015,229
APPARATUS FOR USE IN A VIBRATION TESTING SYSTEM
Filed March 10, 1958 2 Sheets-Sheet 2
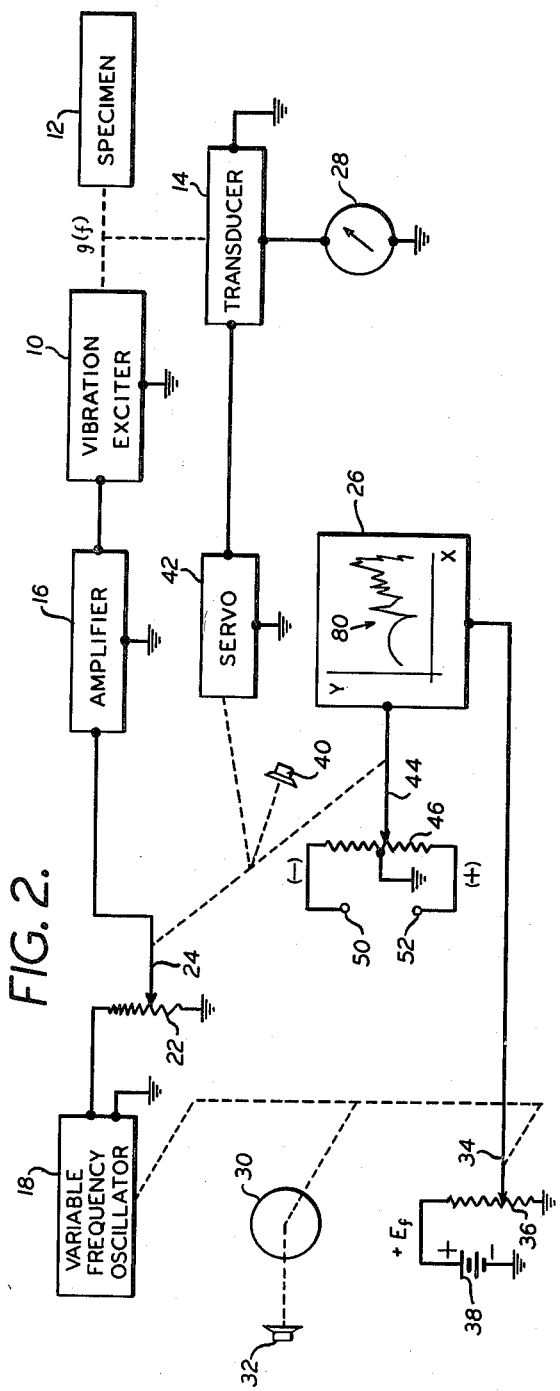
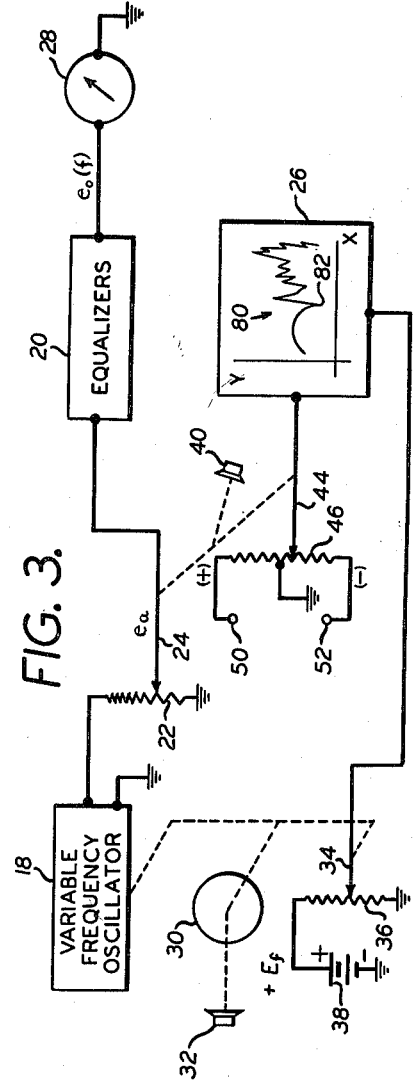
INVENTOR
CHARLES E. MAKI
BY
Byerly, Townsend, Watson & Churchill
ATTORNEYS.

United States Patent Office 3,015,229
Patented Jan. 2, 1962

3,015,229
APPARATUS FOR USE IN A VIBRATION
TESTING SYSTEM
Charles E. Maki, Short Beach, Conn., assignor, by mesne assignments, to Textron Electronics, Inc., a corporation of Rhode Island
Filed Mar. 10, 1958, Ser. No. 720,105
10 Claims. (Cl. 73—71.6)

The present invention relates to vibration testing systems and more particularly to apparatus for us in adjusting the equalizer means in such systems.

A typical vibration testing system includes a vibration exciter for shaking the specimen, a large electronic power amplifier for energizing the exciter, and a signal source for the amplifier. Because of resonances of the specimen and of the moving system of the exciter the gain-frequency characteristic for the exciter and specimen includes a number of sharp peaks and notches and other irregularities. Such irregularities in the gain-frequency characteristic if not compensated for would make it difficult to predetermine the instantaneous displacement and acceleration of the specimen. Therefore, the testing systems have been provided with one or more equalizers which can be adjusted so as to provide the inverse gain-frequency characteristic. When the equalizer means is so adjusted and connected in series with the amplifier and exciter, the overall frequency response becomes substantially flat throughout a given range of frequency. It is the purpose of the present invention to provide apparatus for use in accomplishing the necessary adjustment of the equalizer means for precisely complementing the gain-frequency characteristic of the exciter and specimen.

In accordance with the present invention apparatus is provided comprising in combination with equalizer means and a vibration exciter; a variable frequency oscillator; means coupled thereto for varying the frequency of the oscillator throughout a given range of frequency; means for providing a first signal as a function of the frequency of the oscillator; an adjustable gain component; means coupled to the gain component for adjusting the gain thereof; means for providing a second signal selectably as a direct or inverse function of the gain of the gain component; an X—Y recorder; means coupling the signals to the recorder to control each a different one of the two coordinates; transducer means arranged to be coupled to the vibration exciter for providing a third signal as a function of an operating characteristic of the moving system of the exciter; a signal measuring device; and switch means having at least three operative conditions; the switch means in a first condition coupling an input of the vibration exciter to an output of the oscillator through the gain component, and coupling the signal measuring device to an output of the transducer means; the switch means in a second condiiton coupling the signal measuring device to the output of the oscillator through the equalizer means and gain component in series; and the switch means in a third condition coupling the input of the vibration exciter to a source of vibration inducing signal voltage through the equalizer means; whereby the gain-frequency characteristic can be plotted on the recorder when the switch means is in the first condition and the equalizer means can be adjusted to the inverse of the gain-frequency characteristic when the switch means is in the second condition.

The invention will be better understood after reading the following detailed description of a preferred embodiment thereof with reference to the appended drawings in which:

FIG. 2 is a simplified schematic circuit diagram useful in explaining a first mode of operation of the apparatus of FIG. 1;

FIG. 3 is a simplified schematic circuit diagram useful in explaining a second mode of operation of the apparatus of FIG. 1.

Figure 1:
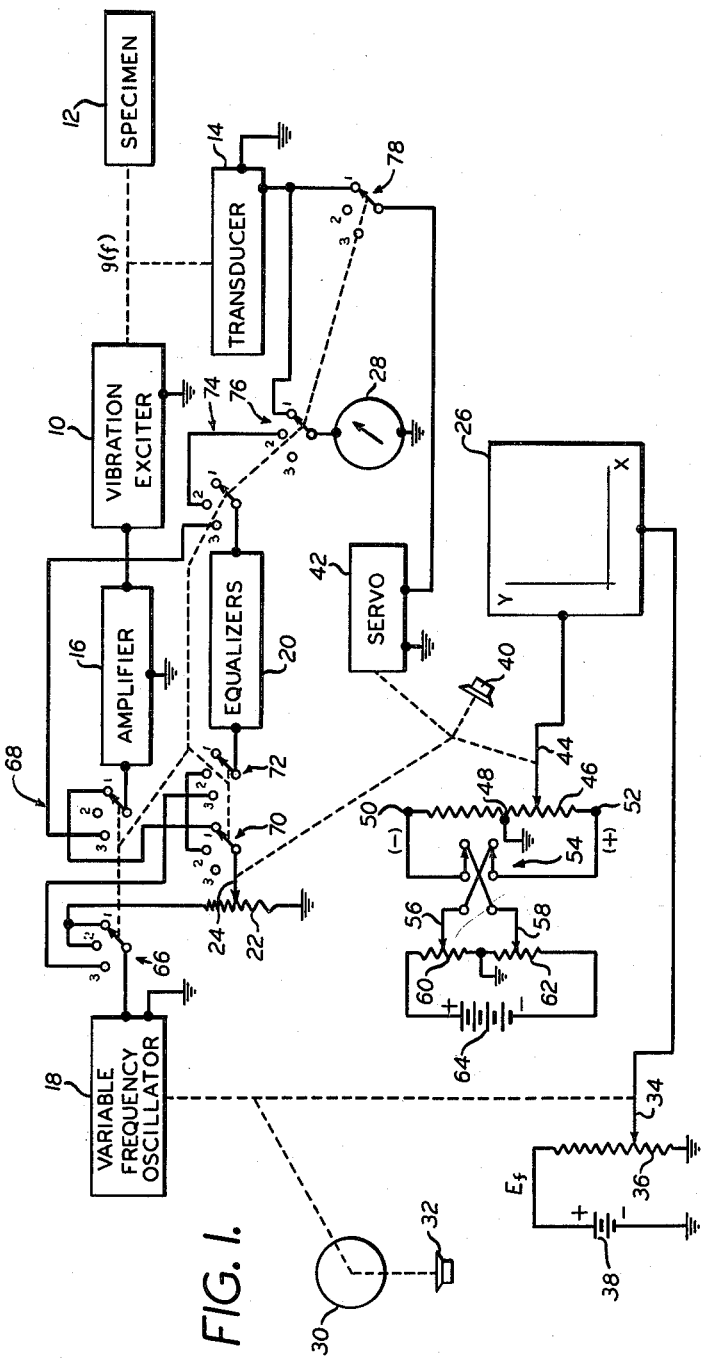
FIG. 1 is a schematic circuit diagram illustrative of the apparatus forming a part of the present invention.

Referring now to FIG. 1, the vibration exciter is represented by the block 10 and is shown mechanically coupled to the specimen 12 and to a transducer 14. The transducer 14 is a device for generating a voltage which is proportional to a characteristic of the movement of the exciter and, therefore, of the specimen. Such characteristic may be either acceleration, displacement or velocity, but for the present discussion it will be assumed to be acceleration. The electronic power amplifier is shown at 16, the variable frequency oscillator is shown at 18, and the equalizers are collectively at 20. The word "collectively" is used since the equalizer means normally includes one or more peak-notch equalizers and an exciter equalizer. The latter compensates for the non-uniform gain-frequency characteristic of the exciter and that part of the specimen which moves in unison therewith, while the peak-notch equalizers each compensate for a separate resonant point of the specimen. For a more detailed description of the equalizers attention is invited to the co-pending applications of Theron Usher, Jr., Serial Nos. 720,234 and 720,235 both filed on March 10, 1958 and assigned to the same assignee as the present application.

The adjustable gain component takes the form in FIG. 1 of a logarithmic potentiometer 22 provided with a moving contact or slider 24. An X—Y recorder is shown at 26, while 28 represents a signal measuring device or voltmeter. Auto-manual means in the form of a motor 30 or manual control 32 is mechanically coupled to the variable frequency oscillator 18 for providing a sweep of the oscillator frequency. This has been shown strictly schematically but may take any well known form for causing the frequency of an oscillator to be swept throughout a particular range.

Mechanically coupled to the movable tuning element is the slider 34 of a linear potentiometer 36. As shown, potentiometer 36 is energized by a source 38 of direct current voltage of magnitude $E_t$ as represented on the drawing.

As shown in FIG. 1 both a manual control 40 and a servo mechanism 42 are mechanically coupled to the slider 24 of the potentiometer 22 for independently adjusting the position thereof and thereby the gain of the potentiometer. The term "gain" is used herein a broad sense to include negative gain or attenuation. Also coupled to the servo mechanism 42 and manual control 40 is the moving contact or slider 44 of a linear potentiometer 46. Thus, it can be appreciated that the slider 44 will follow or move in unison with the slider 24, both in the same direction as seen in the drawing. The resistance element of the potentiometer 46 is provided with a midtap 48 connected to ground or a point of reference potential. The end terminals 50 and 52 of the potentiometer 40 are connected through reversing switch 54 to the sliders 56 and 58 on linear potentiometers 60 and 62, respectively. As shown, potentiometer 60 is connected between the point of reference potential and the positive terminal of a source 64 of direct current voltage while the potentiometer 62 is connected between the point of reference potential and the negative terminal of source 64. It will be evident that the polarity of terminals 50 and 52 are determined by the position of reversing switch 54 while the potentials of these terminals are independently adjustable by means of the sliders 56 and 58.

By way of example only, a suitable switching arrangement is illustrated to show the manner in which the various components can be interconnected in order to carry out the set-up procedure to be explained below. The switching arrangement or means, as shown, comprises seven three-position switches all ganged together for simultaneous operation. The seven switches are designated for reference by numerals 66, 68, 70, 72, 74, 76 and 78. It will be assumed that with the movable elements of the seven switches engaging the associated number 1 contacts as shown in the drawing that the switch means is in a first condition. In a second condition the seven movable contacts will each engage the associated number 2 contacts, while in a third condition they will each engage the associated number 3 contacts.

The output of the variable oscillator is connected to the armature or movable contact of switch 66. Contacts 1 and 2 of switch 66 are connected to the high resistance end of logarithmic potentiometer 22 whose low resistance end is connected to the point of reference potential (ground). Contact 3 of switch 66 is connected to contact 3 of switch 72. The armature of switch 68 is connected to the input of amplifier 16 while contact 1 of this switch is connected to contact 1 of switch 70. Contact 2 of switch 68 is inactive while contact 3 is connected to contact 3 of switch 74. Slider 24 is connected to the armature of switch 70, while contact 3 thereof is inactive and contact 2 is connected to contact 2 of switch 72. Contact 1 of switch 72 is inactive and its armature is connected to the input of the equalizers 20. The output of the equalizers is connected to the armature of switch 74 while contact 1 of this switch is inactive and contact 2 is connected to contact 2 of switch 76. Contact 1 of the latter switch is joined with contact 1 of switch 78 and connected to an output of the transducer 14. The third contact of switch 76 as well as contacts 2 and 3 of switch 78 are inactive. However, the armature of switch 76 is connected to the input of indicating or measuring means (a meter) 28; and the armature of switch 78 is connected to the input of the servo mechanism 42. The apparatus is completed by coupling the slider 44 to control the ordinate or Y-axis of recorder 26 with slider 34 coupled to control the abscissal or X-axis.

In FIG. 2 there is shown the circuit which is established with the seven ganged switches and the reversing switch 54 all in the positions shown in FIG. 1. For convenience, the same reference numerals are used to designate the same or similar parts. Thus, the circuit of FIG. 2 is arranged for recording on the recorder 26 the gain-frequency characteristic of the exciter 10 and specimen 12. Oscillator 18 is initially tuned to the low frequency from which the sweep is to commence. Slider 34 will be near the grounded end of potentiometer 36 and the pen of the recorder will be on or adjacent the Y-axis. If not, it can be adjusted by the conventional axis controls of the recorder. The manual control 40 can then be manipulated so as to adjust potentiometer 22 until a given low acceleration appears at the exciter as read on the meter 28. This adjustment determines the starting position of slider 44 and the potentials at terminals 50 and 52 are adjusted so as to set the pen of the recorder approximately midway along the Y-axis. It is assumed that the usual zero setting controls on the recorder are set appropriately. The servo mechanism 42 may now be cut in by means not shown so as to maintain constant the quantity $g(f)$ at the output of the exciter. This is accomplished by adjusting the gain with potentiometer 23. If the motor 30 is set in operation at a slow speed the gain-frequency characteristic will be automatically plotted. A typical plot is shown at 80 on the recorder 26. If rectangular coordinate paper is used, the plot will represent the ratio in db. of the acceleration of the exciter to the input voltage $$\left(\frac{g(f)}{e_a}\right)$$

vs. frequency in cycles per second. Alternatively, semi-log paper can be used plotting frequency along the logarithmic scale, but a logarithmic conversion will be required for the signal applied to the X-axis of the recorder. This can be obtained very conveniently by providing potentiometer 36 with a logarithmic characteristic. In such case, if a direct reading display is desired, log-log paper may be used.

Having recorded the gain-frequency characteristic of the exciter and specimen, the seven switches are shifted to position 2 and reversing switch 54 is thrown. The circuit which results is shown in FIG. 3. Note that the polarization of potentiometer 46 is reversed with respect to that employed in FIG. 2. Now a low frequency is chosen as a reference point by manipulating control 32. The positions of sliders 24 and 44 are changed with manual control 40 until the pen of the recorder rests on the curve 80. The reading on meter 28 is noted. The frequency of the oscillator is then tuned to the first resonant point or until the pen lies on the ordinate passing through the point 82. It will be understood that this represents the notch due to speciment resonance. The Y deflection is again adjusted by manipulating control 40 until the pen is superimposed on the curve 80. Now the equalizer is adjusted so as to change is output $e_0(f)$ to restore the reading of meter 28 to that which was previously noted. This process is repeated at each resonant point, peak and notch, until the equalizers are completely adjusted. The time consumed in this phase of the set-up procedure is not critical since the specimen is not involved. In prior methods the specimen was excited all the time and many times it was damaged or destroyed before the equipment was adjusted for commencing the actual test.

Figure 4:
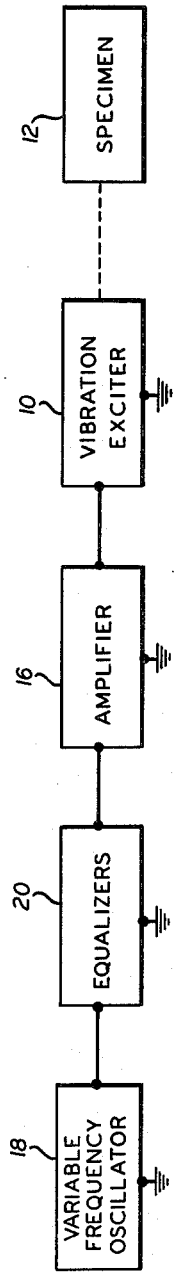
FIG. 4 is a simplified block diagram useful in explaining a third mode of operation of the apparatus of FIG. 1.

With the equalizers adjusted the switches can be thrown to their third position placing the equalizers in series with the exciter as seen in FIG. 4. Now the system response is flat with the equalizers adjusted to have an inverse gain characteristic with respect to that of the exciter and specimen. As a consequence, exciter acceleration will be proportional to the magnitude of the voltage supplied by the variable frequency oscillator or any other signal source used in its stead such as a source of random noise signals for random motion testing.

It will be apparent that numerous changes may be made in the apparatus described herein without departing from the spirit of the invention.

What I claim is:

1. Apparatus for use in adjusting the equalizer means in a vibration testing system to compensate for the vibration exciter and specimen gain-frequency characteristic comprising in combination with equalizer means and and a vibration exciter: a variable frequency oscillator; means coupled thereto for varying the frequency of said oscillator throughout a given range; means for providing a first signal as a function of the frequency of said oscillator; an adjustable gain component; means coupled to said gain component for adjusting the gain thereof; means for providing a second signal selectably as a direct or inverse logarithmic function of the gain of said gain component; an X—Y recorder; means coupling said signals to the recorder to control each a different one of the two coordinates; transducer means arranged to be coupled to said vibration exciter for providing a third signal as a function of an operating characteristic of the moving system of said exciter; a signal measuring device; and switch means having at least three operative conditions; said switch means in a first condition coupling an input of said vibration exciter to an output of said oscillator through said gain component, and coupling said signal measuring device to an output of said transducer means; said switch means in a second condition coupling said signal measuring device to said output of the oscillator through said equalizer means and gain component in series; and said switch means in a third condition coupling said input of the vibration exciter to a source of vibration inducing input voltage through said equalizer means; whereby said gain-frequency characteristic can be plotted on the recorder when said switch means is in said first condition and said equalizer means can be adjusted to the inverse of said gain-frequency characteristic when said switch means is in said second condition.

2. Apparatus according to claim 1, wherein said adjustable gain component comprises a logarithmic potentiometer.

3. Apparatus according to claim 1, wherein said means for adjusting the gain of said gain component comprises when said switch means is in said first condition a servo system responsive to the output of said transducer means for adjusting said gain to maintain constant that operating characteristic of the vibration exciter to which the transducer means responds, and a manual control when said switch means is in said second condition.

4. Apparatus for use in adjusting the equalizer means in a vibration testing system to compensate for the vibration exciter and specimen gain-frequency characteristic comprising in combination with equalizer means and a vibration exciter: a variable frequency oscillator; automanual position variable means coupled thereto for varying the frequency of said oscillator throughout a given range; a potentiometer energized by a source of voltage and having its wiper contact coupled in driven relationship to said position variable means for providing a first signal as a function of the frequency of said oscillator; and adjustable gain component; means coupled to said gain component for adjusting the gain thereof; means for providing a second signal selectably as a direct or inverse logarithmic function of the gain of said gain component; and X—Y recorder; means coupling said signals to the recorder to control each a different one of the two coordinates; transducer means arranged to be coupled to said vibration exciter for providing a third signal as a function of an operating characteristic of the moving system of said exciter; a signal measuring device; and switch means having at least three operative conditions; said switch means in a first condition coupling an input of said vibration exciter to an output of said oscillator through said gain component, and coupling said signal measuring device to an output of said transducer means; said switch means in a second condition coupling said signal measuring device to said output of the oscillator through said equalizer means and gain component in series; and said switch means in a third condition coupling said input of the vibration exciter to a source of vibration inducing input voltage through said equalizer means; whereby said gain-frequency characteristic can be plotted on the recorder when said switch means is in said first condition and said equalizer means can be adjusted to the inverse of said gain-frequency characteristic when said switch means is in said second condition.

5. Apparatus for use in adjusting the equalizer means in a vibration testing system to compensate for the vibration exciter and specimen gain-frequency characteristic comprising in combination with equalizer means and a vibration exciter: a variable frequency oscillator; means coupled thereto for varying the frequency of said oscillator throughout a given range; means for providing a first signal as a function of the frequency of said oscillator; a logarithmic potentiometer; means coupled to the movable contact of said potentiometer for adjusting the position thereof; a linear potentiometer with a mid-tap on its resistance element connected to a point of reference potential and with the end terminals of said resistance element connected across a source of direct voltage of selectable polarity, the movable contact of said linear potentiometer being coupled to the movable contact of said logarithmic potentiometer for conjoint operation for providing a second signal selectably as a direct or inverse function of the setting of said logarithmic potentiometer dependent upon said polarity; an X—Y recorder; means coupling said signals to the recorder to control each a different one of the two coordinates; transducer means arranged to be coupled to said vibration exciter for providing a third signal as a function of an operating characteristic of the moving system of said exciter; a signal measuring device; and switch means having at least three operative conditions; said switch means in a first condition coupling an input of said vibration exciter to an output of said oscillator through said logarithmic potentiometer, and coupling said signal measuring device to an output of said transducer means; said switch means in a second condition coupling said signal measuring device to said output of the oscillator through said equalizer means and logarithmic potentiometer in series; and said switch means in a third condition coupling said input of the vibration exciter to a source of vibration inducing input voltage through said equalizer means; whereby said gain-frequency characteristic can be plotted on the recorder when said switch means is in said first condition and said equalizer means can be adjusted to the inverse of said gain-frequency characteristic when said switch means is in said second condition.

6. Apparatus according to claim 5, wherein said means for adjusting the movable contact of the logarithmic potentiometer comprises when said switch means is in said first condition a servo system responsive to the output of said transducer means for adjusting said logarithmic potentiometer to maintain constant that output characteristic of the vibration exciter to which the transducer means responds, and a manual control when said switch means is in said second condition.

7. Apparatus for recording the gain-frequency characteristic of a vibration exciter and specimen in a vibration testing system comprising in combination with a vibration exciter: a variable frequency oscillator; means coupled thereto for varying the frequency of said oscillator throughout a given range; means for providing a first signal as a function of the frequency of said oscillator; an adjustable gain component; means coupled to said gain component for adjusting the gain thereof; means for providing a second signal as an inverse logarithmic function of the gain of said gain component; an X—Y recorder; means coupling said signals to the recorder to control each a different one of the two coordinates; transducer means arranged to be coupled to said vibration exciter for providing a third signal as a function of an operating characteristic of the moving system of said exciter; a signal measuring device; and means coupling an input of said vibration exciter to an output of said oscillator through said gain component, and coupling said signal measuring device to an output of said transducer means.

8. Apparatus for recording the gain-frequency characteristic of a vibration exciter and specimen in a vibration testing system comprising in combination with a vibration exciter: a variable frequency oscillator; means coupled thereto for varying the frequency of said oscillator throughout a given range; means for providing a first signal as a function of the frequency of said oscillator; a logarithmic potentiometer; means coupled to the movable contact of said potentiometer for adjusting the position thereof; a linear potentiometer with a mid-tap on its resistance element connected to a point of reference potential and with the end terminals of said resistance element connected across a source of direct voltage, means coupling the movable contact of said linear potentiometer to the movable contact of said logarithmic potentiometer for conjoint operation such that the linear potentiometer will provide a second signal as an inverse function of the setting of said logarithmic potentiometer; an X—Y recorder; means coupling said signals to the recorder to control each of different one of the two coordinates; transducer means arranged to be coupled to said vibration exciter for providing a third signal as a function of an operating characteristic of the moving system of said exciter; a signal measuring device; and means coupling an input of said vibration exciter to an output of said oscillator through said logarithmic potentiometer, and coupling said signal measuring device to an output of said transducer means.

9. Apparatus for use in adjusting the equalizer means in a vibration testing system such that its gain-frequency characteristic is the inverse of a pre-recorded gain-frequency characteristic comprising in combination with equalizer means: a variable frequency oscillator; means coupled thereto for varying the frequency of said oscillator throughout a given range; means for providing a first signal as a function of the frequency of said oscillator; an adjustable gain component; means coupled to said gain component for adjusting the gain thereof; means for providing a second signal as a direct logarithmic function of the gain of said gain component; an X—Y recorder with said pre-recorded characteristic displayed thereon; means coupling said signals to the recorder to control each the appropriate coordinate corresponding to the pre-recorded characteristic; a signal measuring device; and means coupling said signal measuring device to an output of the oscillator through said equalizer means and gain component in series.

10. Apparatus for use in adjusting the equalizer means in a vibration testing system such that its gain-frequency characteristic is the inverse of a pre-recorded gain-frequency characteristic comprising in combination with equalizer means: a variable frequency oscillator; means coupled thereto for varying the frequency of said oscillator throughout a given range; means for providing a first signal as a function of the frequency of said oscillator; a logarithmic potentiometer; means coupled to the movable contact of said potentiometer for adjusting the position thereof; a linear potentiometer with a mid-tap on its resistance element connected to a point of reference potential and with the end terminals of said resistance element connected across a source of direct voltage, means coupling the movable contact of said linear potentiometer to the movable contact of said logarithmic potentiometer for conjoint operation such that the linear potentiometer will provide a second signal as a direct function of the setting of said logarithmic potentiometer; an X—Y recorder with said pre-recorded characteristic displayed thereon; means coupling said signals to the recorder to control each the appropriate coordinate corresponding to the pre-recorded characteristic; a signal measuring device; and means coupling said signal measuring device to an output of the oscillator through said equalizer means and logarithmic potentiometer in series.

References Cited in the file of this patent

UNITED STATES PATENTS

| | | |
|---|---|---|
| 2,361,990 | Brown | Nov. 7, 1944 |
| 2,439,131 | Firestone | Apr. 6, 1948 |
| 2,562,450 | De Lano | July 31, 1951 |
| 2,685,671 | Grimes | Aug. 3, 1954 |
| 2,729,972 | Schwidetzky | Jan. 10, 1956 |
| 2,800,789 | Henry | July 30, 1957 |
| 2,844,777 | Ross | July 22, 1958 |
| 2,904,681 | Jones et al. | Sept. 15, 1959 |

UNITED STATES PATENT OFFICE
CERTIFICATE OF CORRECTION

Patent No. 3,015,229 January 2, 1962

Charles E. Maki

It is hereby certified that error appears in the above numbered patent requiring correction and that the said Letters Patent should read as corrected below.

Column 1, line 11, for "us" read -- use --; column 2, line 53, for "herein" read -- here in --; line 63, for "40" read -- 46 --; column 3, line 70, for "23" read -- 22 --; line 74, for "db." read -- db --; column 4, line 25, for "speciment" read -- specimen --; line 28, for "is", second occurrence, read -- its --; line 56, strike out "and", second occurrence; column 5, line 28, for "automanual" read -- auto-manual --; lines 34 and 38, for "and", each occurrence, read -- an --; column 7, line 1, for "of", first occurrence, read -- a --.

Signed and sealed this 1st day of May 1962.

(SEAL)
Attest:

ERNEST W. SWIDER
Attesting Officer

DAVID L. LADD
Commissioner of Patents